3,458,416
PHOTOLYTIC CONDENSATION OF SATURATED HYDROCARBONS WITH POLYCHLORINATED OLEFINS
Thomas J. Hardwick, O'Hara Township, Allegheny County, and John M. Jarvie, Monroeville Borough, Pa., assignors to Gulf Research & Development Company, Pittsburgh, Pa., a corporation of Delaware
No Drawing. Filed Apr. 26, 1966, Ser. No. 545,278
Int. Cl. C07c *3/24;* B01j *1/10*
U.S. Cl. 204—163          9 Claims

ABSTRACT OF THE DISCLOSURE

Polychlorinated olefins, such as tetrachloroethylene, are condensed with saturated hydrocarbons, such as cyclohexane, in the presence of actinic light and in the absence of a catalyst and a gas containing free molecular oxygen.

---

This invention relates to the photolytic condensation of saturated hydrocarbons with polychlorinated olefinic hydrocarbons to produce an unsaturated chlorinated hydrocarbon having the sum of the carbon atoms of the saturated hydrocarbon and polychlorinated olefinic hydrocarbon charge stocks.

The reaction of polychlorinated olefins, particularly polychlorinated ethylene, with paraffins and aromatics to produce unsaturated chlorinated condensation products under the influence of catalytic means, such as peroxy compounds, is known in the art. These processes suffer from the disadvantage of the use of expensive catalysts which cannot be recycled to the process since they are destroyed during reaction or are difficult or impossible to recover. It has now been found that saturated hydrocarbons, as compared with aromatic hydrocarbons, are unique in their ability to condense with polychlorinated olefins by photolytic means alone which eliminates all problems of expense and separation associated with the use of catalysts in addition to simplifying the purification problem of the final products.

In accordance with the invention, an unsaturated chlorinated monomeric hydrocarbon condensation product is produced by a process which comprises contacting a polychlorinated olefinic hydrocarbon having at least one chlorine atom attached to each of the doubly bonded carbon atoms of at least one olefinic double bond with a saturated hydrocarbon containing more than two carbon atoms in the presence of actinic light and in the absence of a catalyst and in the absence of a gas containing free molecular oxygen.

The saturated hydrocarbon charge stock component can be any aliphatic or alicyclic hydrocarbon or substituted saturated hydrocarbon having at least 3 carbon atoms per molecule, preferably between 3 and 30 carbon atoms per molecule, more preferably between 4 and 20 carbon atoms per molecule. Mixtures of paraffins may also be employed. By "substituted saturated hydrocarbon" is meant a substituted saturated hydrocarbon where the substituents are selected from the group consisting of fluorine, chlorine, sulfate, nitrile, carboxyl, hydroxyl and the like. For compounds containing substituents with high electron affinity, for example, sulfate, nitrile, carboxy, and hydroxyl, the number of carbon atoms in the compound should preferably exceed five. Examples of suitable saturated hydrocarbons include, but are not limited to, propane; n-butane; isobutane; n-butylchloride; pentane; isopentane; cyclopentane; cyclohexane; n-hexane; n-heptane; decane; 2-methyl-4-propyl heptane; n-hexadecane; n-octadecane; eicosane; tricosane; paraffin wax; decalin; polyethylene; 1,1,1-trifluoroheptane; cyclohexylsulfate; valeronitrile; octanoic acid; and tridecylalcohol.

The polychlorinated olefinic hydrocarbon can be any hydrocarbon having at least one olefinic double bond and at least one chlorine atom attached to each doubly bonded carbon atom of at least one of the olefinic double bonds. The olefinic hydrocarbon must, of course, have at least two carbon atoms and can have as many as 30 carbon atoms, or more. The olefinic hydrocarbon is preferably a monoolefin, and more preferably an alpha- or terminal monoolefin having between 2 and 6 carbon atoms and at least one chlorine atom on the alpha and beta carbon atoms. The most preferred polychlorinated olefinic hydrocarbons are the polychlorinated ethylenes, particularly tri- and tetra-chlorinated ethylene. It is necessary that the olefinic hydrocarbon have at least two chlorine atoms per molecule since monochlorinated olefins do not condense by the process of this invention.

Examples of other suitable polychlorinated olefins include, but are not limited to, 1,2-dichloropropene-1; 1,1, 2-trichloropropene-1; 2,3,3-trichloropentene-2; α,b,b-trichlorostyrene; and 1,2-dicyclohexyl-1,2-dichloroethene.

The process of this invention may be represented by the following general equation:

where R can be any saturated hydrocarbon radical; and $R_1$ and $R_2$ can be the same or different and are selected from the group consisting of hydrogen, chlorine, and a saturated hydrocarbon radical.

As noted from the above equation, the molar ratio of the saturated hydrocarbon to the polychlorinated alkene is 1:1 in order to produce one molecular proportion of the desired monomeric condensation product. The molar ratio of the saturated hydrocarbon to the polychlrinated olefin of the saturated hydrocarbon to the polychlorinatetd olefin ferred ratios being between 50:1 and 5:1.

At the lower ratios, by-product formation reduces the selectivity of the desired reaction. At extremely high ratios, the reaction rate to form the desired product is low.

The process of this invention may be carried out very simply by exposing the defined saturated hydrocarbon and defined polychlorinated olefin to actinic light. By actinic light is meant those rays of the spectrum which produce chemical changes. The actinic light suitable for use in the process of this invention are those in the ultraviolet region. Suitable actinic light is that having a wavelength of less than 3200 A., preferably 2000 A.–3000 A., and most preferably 2200 A. to 2800 A.

Any suitable source of actinic light can be employed, for example, light emission from excited atoms of mercury, cadmium, zinc, sodium, iodine, argon, and others. Perhaps the most commonly employed source of light for photochemical work is the mercury lamp, which produces a light in the ultraviolet region. For a description of the mercury lamps and other suitable light sources, see Calvert and Pitts, "Photochemistry," published by John Wiley and Sons, Inc., New York (1966), especially pp. 687–721. Shorter wavelength actinic light can be obtained by metallic sparks or rare-gas lamps.

A suitable light source should emit between $1 \times 10^{15}$ and $1 \times 10^{20}$ photons/second, and preferably should emit between $5 \times 10^{17}$ and $1 \times 10^{19}$ photons/second. The reaction rate is, of course, dependent on the photons absorbed per cubic centimeter per second. It is common practice to have the charge stocks surround the light source in order to increase the efficiency of absorption of the emitted light. The further the charge stock is from the light source, the lower the light intensity in the reaction medium and the less light will be absorbed. In order to obtain suitable absorption rates, the charge stocks should be in as close a proximity to the light source as possible. The absorption rate is suitably between $1 \times 10^{13}$ and $1 \times 10^{18}$ photons per cubic centimeter per second with the preferred absorption rate between $5 \times 10^{15}$ and $1 \times 10^{17}$ photons per cubic centimeter per second.

The temperature at which the photolysis reaction can be run is suitably between 0° and 200° C., and is preferably between 20° and 100° C. The reaction rate is too slow at temperatures less than 0° C., while at temperatures over 200° C., there are problems associated with the generation of higher pressures which are difficult to handle in the glass-type equipment employed.

The reaction pressure is usually that generated by the reactants at the desired reaction temperature. The pressure should, however, be high enough to maintain the reactants in the liquid phase.

Suitable apparatus must naturally be employed, it being commonly known that ordinary glass is opaque to actinic light having a wavelength less than 3000 A. For the shorter wavelength light, fused silica (quartz), special phosphate glass or Vycor apparatus can be used. "Vycor" is the trade name of Corning Glass for a quartz-type glass.

The mixed charge stock of this invention can be exposed to the actinic light for periods of time between 0.1 and 36 hours depending on light intensity. In general, the higher the intensity the shorter the reaction time. The usual reaction times are between 0.2 and 2 hours.

The charge stocks and any open or unused reaction space must be free of substances, such as molecular oxygen which tend to inhibit the reaction. It is preferable therefore to purge the charge stocks while heating with an inert gas, such as $N_2$ to remove small amounts of molecular oxygen from the reaction zone. It is also preferred to continue the nitrogen purge to keep the reaction zone free of oxygen, produced HCl or other unwanted gaseous products.

The invention will be further described with reference to the following experimental work.

EXAMPLE 1

A solution of tetrachloroethylene in cyclohexane containing five percent by volume of tetrachloroethylene was photolysed with a medium pressure mercury lamp which emitted actinic light having the desired wavelength. The charge stock (80 ml.) was degassed before use. The photolysis occurred at a temperature of 25° C. and the irradiation lasted for thirty minutes. Analysis of the product showed that about 50 percent of the tetrachloroethylene had reacted to form a product which was a condensation product of the cyclohexane and tetrachloroethylene. A chlorine determination by activation analysis indicated the chlorine content was 47.43 percent. The only condensation produced between cyclohexane and tetrachloroethylene that could give this chlorine value would be trichlorovinylcyclohexane $C_6H_{11}CCl = CCl_2$). The lamp was Hanovia's Type A673A, 550 w. lamp. (See pp. 696–698 of Calvert and Pitts "Photochemistry" book noted above.)

EXAMPLE 2

Example 1 was repeated except a low pressure mercury lamp emitting actinic light having a wavelength of mainly 2537 A. was employed. The lamp was made by the inventors and was run at 90 milliamps. Trichlorovinylcyclohexane was again obtained as the product.

EXAMPLE 3

Examples 1 and 2 were repeated except cumene was used in place of the cyclohexane. Both the cumene and tetrachloroethylene charge stocks were recovered unreacted.

EXAMPLE 4

Example 3 was repeated except toluene was used in place of cumene. Substantially the same results were obtained as in Example 3.

A comparison of Examples 1 through 4 shows the criticality of the type of charge stock which must be used in the process of the subject reaction. While it is well known in the art that both aromatic hydrocarbons and saturated aliphatic and alicyclic hydrocarbons undergo catalytic reaction to form condensation products, it was found, as noted by the data in Examples 1 through 4 that, for some unknown reason, only saturated aliphatic and alicyclic hydrocarbons react in accordance with the process of this invention.

Further experiments were carried out with the tetrachloroethylene-cyclohexane system. An immersion type cylindrical "Vycor" cell permitted a low pressure mercury lamp to be placed in an annular space inside the cell so that all of the ultraviolet light (mainly 2537 A.) could be utilized by the solution. The quantum output of the lamp was determined to be $1.87 \times 10^{18}$ photons/second.

EXAMPLE 5

In the run for this example, 1600 milliliters of a solution containing five percent by volume tetrachloroethylene in cyclohexane was photolysed at 80° C. for four and one-half hours using the Vycor immersion cell for the low pressure lamp noted above. The charge stock was, of course, deoxygenated with nitrogen before the run and a slow bleed of nitrogen maintained during the run.

The photolysed solution was distilled to remove the cyclohexane and unreacted tetrachloroethylene and the residue was further fractionated in a micro-still at 10 mm. Hg pressure. A fraction which boiled at 100° C. was identified as the product of the photolysis by gas chromatography. The product was about 96 percent pure trichlorovinylcyclohexane. The quantum yield of trichlorovinylcyclohexane was 3.0 molecules per photon absorbed. By quantum yield is meant the number of molecules of product formed per photon absorbed.

Except for those instances where methane, ethane, cyclobutane, cyclopentane or cyclohexane is employed as the saturated hydrocarbon charge stock component, the reaction products are a mixture of a number of different isomers. When cyclobutane, cyclopentane or cyclohexane is employed, a single product is produced. In general, the products are stable, water-white liquids with a low melting point and high boiling point, and a mild pleasant odor. When tri- or tetrachloroethylene is employed as the charge stock, together with saturated hydrocarbons having between 3 and 10 carbon atoms, the products have a high chlorine content (40–50 percent by weight) which imparts to the products a high flash point considerably higher than those of common dry-cleaning solvents. In addition to being relatively non-inflammable, the products are relatively non-toxic and the low molecular weight products can be used as solvents and refrigerants. The higher molecular weight products can be used as synthetic lube oils, etc.

Resort may be had to such variations and modifications as fall within the spirit of the invention and the scope of the appended claims.

We claim:

1. A process for condensing a polychlorinated olefinic hydrocarbon having at least one chlorine atom attached to each of the double bonded carbon atoms of at least one olefinic double bond with either a saturated hydrocarbon containing more than two carbon atoms or a substituted saturated hydrocarbon containing more than two carbon atoms and wherein the substituents are selected from the group consisting of fluorine, chlorine, sulfate, nitrile, carboxyl and hydroxyl in the presence of actinic light, and in the absence of a catalyst and in the absence of a gas containing free molecular oxygen.

2. A process according to claim 1 wherein the polychlorinated olefinic hydrocarbon is an alpha-monoolefin having between 2 and 6 carbon atoms and at least one chlorine atom on the alpha- and beta-carbon atoms.

3. A process according to claim 2 wherein the polychlorinated olefin is condensed with a saturated hydrocarbon having from 3 to 30 carbon atoms per molecule.

4. A process according to claim 2 wherein the polychlorinated olefinic hydrocarbon has two carbon atoms and between 3 and 4 chlorine atoms, and the saturated hydrocarbon has between 5 and 10 carbon atoms.

5. A process according to claim 4 wherein the actinic light has a wavelength between 2000 A. and 3200 A.

6. A process according to claim 5 wherein the reaction temperature is between 0° and 200° C.

7. A process according to claim 5 wherein the saturated hydrocarbon is cyclohexane.

8. A process according to claim 5 wherein the polychlorinated olefinic hydrocarbon is tetrachloroethylene.

9. A process according to claim 5 wherein the saturated hydrocarbon is cyclohexane and the polychlorinated olefinic hydrocarbon is tetrachloroethylene.

References Cited

UNITED STATES PATENTS

| 2,015,044 | 9/1935 | Teichmann et al. | 204—163 |
| 2,393,509 | 1/1946 | Archibald et al. | 204—163 |
| 2,788,375 | 4/1957 | Ehrenfeld | 204—163 X |

FOREIGN PATENTS

| 1,188,064 | 4/1965 | Germany. |

HOWARD S. WILLIAMS, Primary Examiner

U.S. Cl. X.R.

204—158

PO-1050
(5/69)

UNITED STATES PATENT OFFICE
CERTIFICATE OF CORRECTION

Patent No. 3,458,416          Dated July 29, 1969

Inventor(s) Hardwick, Thomas J. and Jarvie, John M.

It is certified that error appears in the above-identified patent and that said Letters Patent are hereby corrected as shown below:

Column 2, delete line 37 and insert in lieu thereof "can suitable vary between 500:1 and 0.1:1, with the pre-". Column 3, lines 54, the parenthesis has been omitted before the formula.

SIGNED AND
SEALED
JAN 6 - 1970

(SEAL)
Attest:

Edward M. Fletcher, Jr.
Attesting Officer

WILLIAM E. SCHUYLER, JR.
Commissioner of Patents